(12) United States Patent
Cohen et al.

(10) Patent No.: US 11,042,599 B1
(45) Date of Patent: *Jun. 22, 2021

(54) IDENTIFYING RELEVANT MESSAGES IN A CONVERSATION GRAPH

(71) Applicant: Twitter, Inc., San Francisco, CA (US)

(72) Inventors: Ross Cohen, San Francisco, CA (US); Kyle Maxwell, San Francisco, CA (US); Stuart Hood, San Francisco, CA (US); Cara Meverden, San Francisco, CA (US); Coleen Baik, San Francisco, CA (US); Marcel Molina, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,187

(22) Filed: Apr. 7, 2020

Related U.S. Application Data

(63) Continuation of application No. 16/298,799, filed on Mar. 11, 2019, now Pat. No. 10,891,348, which is a
(Continued)

(51) Int. Cl.
*G06F 15/16* (2006.01)
*G06F 16/955* (2019.01)
(Continued)

(52) U.S. Cl.
CPC ...... *G06F 16/9558* (2019.01); *G06F 3/04842* (2013.01); *H04L 51/16* (2013.01); *H04L 51/32* (2013.01)

(58) Field of Classification Search
USPC ........................................ 715/206, 716, 752
See application file for complete search history.

(56) References Cited

U.S. PATENT DOCUMENTS 5,819,299 A   10/1998   Bejar
5,848,412 A   12/1998   Rowland et al.
(Continued)

OTHER PUBLICATIONS

Khrabrov, "Mind Economy: Dynamic Graph Analysis of Communications", University of Pennsylvania, Publicly Accessible Penn Dissertations, 455, 2011, 236 pages.
(Continued)

*Primary Examiner* — Jude Jean Gilles
(74) *Attorney, Agent, or Firm* — Brake Hughes Bellermann LLP

(57) ABSTRACT

According to an aspect, a method for identifying relevant messages in a conversation graph on a messaging platform includes transmitting, over a network, messages between a plurality of users on the messaging platform, generating a conversation graph based on relationships between the messages, where the conversation graph includes a plurality of messages related to a conversation, and the plurality of messages of the conversation graph include a root message and one or more reply messages connected to the root message. The method includes marking a subset of the plurality of messages of the conversation graph as relevant to the conversation, including marking a message from a user account having a credibility rating over a threshold level, and transmitting, over the network, digital information to render the subset of the plurality of messages on a user interface of a computing device.

20 Claims, 8 Drawing Sheets

Related U.S. Application Data continuation of application No. 14/824,015, filed on Aug. 11, 2015, now Pat. No. 10,229,218, which is a continuation of application No. 13/736,634, filed on Jan. 8, 2013, now Pat. No. 9,143,468.

(51) Int. Cl.
*H04L 12/58* (2006.01)
*G06F 3/0484* (2013.01)
*H04L 29/06* (2006.01)

(56) References Cited

U.S. PATENT DOCUMENTS

| | | |
|---|---|---|
| 6,275,811 B1 | 8/2001 | Ginn et al. |
| 6,631,351 B1 | 10/2003 | Ramachandran et al. |
| 6,721,706 B1 * | 4/2004 | Strubbe .............. G10L 15/18 704/275 |
| 6,731,307 B1 * | 5/2004 | Strubbe .............. G10L 17/26 715/727 |
| 6,795,808 B1 * | 9/2004 | Strubbe ............. G10L 15/1822 704/275 |
| 6,985,933 B1 | 1/2006 | Singhal et al. |
| 7,363,590 B2 | 4/2008 | Kerr et al. |
| 7,546,131 B1 | 6/2009 | Sidi et al. |
| 7,752,649 B1 | 7/2010 | Harvey et al. |
| 7,830,925 B1 | 11/2010 | Harvey et al. |
| 8,185,558 B1 | 5/2012 | Narayanan et al. |
| 8,340,971 B1 | 12/2012 | Abella et al. |
| 8,369,225 B2 | 2/2013 | Sun et al. |
| 8,400,436 B1 | 3/2013 | Kuck et al. |
| 8,572,129 B1 | 10/2013 | Lee et al. |
| 8,601,019 B1 | 12/2013 | Weininger et al. |
| 8,612,882 B1 | 12/2013 | Secord et al. |
| 8,626,862 B2 | 1/2014 | Frank et al. |
| 8,645,332 B1 | 2/2014 | Cohen et al. |
| 8,670,531 B2 | 3/2014 | Katis et al. |
| 8,775,517 B1 | 7/2014 | Goldman et al. |
| 8,819,150 B1 | 8/2014 | Osinga et al. |
| 9,143,468 B1 * | 9/2015 | Cohen ................ G06F 16/9558 |
| 9,177,336 B2 | 11/2015 | Hjelm et al. |
| 9,292,880 B1 | 3/2016 | Koorakula et al. |
| 9,418,117 B1 | 8/2016 | Molina et al. |
| 9,424,359 B1 | 8/2016 | Hamadani et al. |
| 9,449,050 B1 | 9/2016 | Molina et al. |
| 10,229,218 B1 * | 3/2019 | Cohen ................ G06F 3/04842 |
| 10,545,966 B1 | 1/2020 | Molina et al. |
| 10,891,348 B1 * | 1/2021 | Cohen ................ H04L 51/32 |
| 2003/0041147 A1 | 2/2003 | Van Den Oord et al. |
| 2004/0002049 A1 | 1/2004 | Beavers et al. |
| 2006/0059434 A1 | 3/2006 | Boss et al. |
| 2006/0075120 A1 | 4/2006 | Smit et al. |
| 2006/0168509 A1 | 7/2006 | Boss et al. |
| 2006/0200442 A1 | 9/2006 | Parikh et al. |
| 2006/0242109 A1 | 10/2006 | Pereira et al. |
| 2006/0259473 A1 | 11/2006 | Li et al. |
| 2007/0239631 A1 | 10/2007 | Wang |
| 2008/0012701 A1 * | 1/2008 | Kass ................... G16H 20/30 340/539.11 |
| 2008/0086534 A1 | 4/2008 | Bardak et al. |
| 2008/0114594 A1 | 5/2008 | Forbes et al. |
| 2008/0209338 A1 | 8/2008 | Li et al. |
| 2008/0320411 A1 | 12/2008 | Chen et al. |
| 2009/0037527 A1 | 2/2009 | Hodges et al. |
| 2009/0203361 A1 | 8/2009 | Huang et al. |
| 2009/0210800 A1 | 8/2009 | McCann et al. |
| 2009/0234924 A1 | 9/2009 | Edelen et al. |
| 2009/0271700 A1 | 10/2009 | Chen et al. |
| 2009/0300491 A1 | 12/2009 | Wasmund et al. |
| 2009/0313346 A1 | 12/2009 | Sood et al. |
| 2010/0002685 A1 | 1/2010 | Shaham et al. |
| 2010/0017753 A1 | 1/2010 | Li et al. |
| 2010/0077041 A1 | 3/2010 | Cowan et al. |
| 2010/0255865 A1 | 10/2010 | Karmarkar |
| 2010/0268597 A1 | 10/2010 | Bookstaff et al. |
| 2010/0273443 A1 | 10/2010 | Forutanpour et al. |
| 2010/0318538 A1 | 12/2010 | Wyman et al. |
| 2011/0173174 A1 | 7/2011 | Flitcroft et al. |
| 2011/0191693 A1 | 8/2011 | Baggett et al. |
| 2011/0238682 A1 | 9/2011 | Ootaki et al. |
| 2011/0264681 A1 | 10/2011 | Kimberlin et al. |
| 2011/0295878 A1 | 12/2011 | Bennett et al. |
| 2012/0059722 A1 | 3/2012 | Rao et al. |
| 2012/0124147 A1 | 5/2012 | Hamlin et al. |
| 2012/0150979 A1 | 6/2012 | Monaco et al. |
| 2012/0173243 A1 * | 7/2012 | Anand ................... G06F 40/40 704/270.1 |
| 2012/0240062 A1 | 9/2012 | Passmore et al. |
| 2012/0271860 A1 | 10/2012 | Graham et al. |
| 2012/0284093 A1 | 11/2012 | Evans et al. |
| 2012/0311419 A1 | 12/2012 | Kwak et al. |
| 2012/0317097 A1 | 12/2012 | Tseng et al. |
| 2013/0036177 A1 * | 2/2013 | Leeder ................ G06Q 10/107 709/206 |
| 2013/0041916 A1 | 2/2013 | Biesecker et al. |
| 2013/0041949 A1 | 2/2013 | Biesecker et al. |
| 2013/0054632 A1 | 2/2013 | Van Dijk et al. |
| 2013/0072221 A1 | 3/2013 | Chen et al. |
| 2013/0110565 A1 | 5/2013 | Means et al. |
| 2013/0124542 A1 | 5/2013 | Lee et al. |
| 2013/0141513 A1 | 6/2013 | Setton et al. |
| 2013/0173718 A1 | 7/2013 | Bhat et al. |
| 2013/0282844 A1 | 10/2013 | Logan et al. |
| 2013/0304726 A1 | 11/2013 | Sandulescu et al. |
| 2014/0095418 A1 * | 4/2014 | Scholand ............. G06T 11/206 706/46 |
| 2014/0095419 A1 | 4/2014 | Gandhi et al. |
| 2014/0129936 A1 | 5/2014 | Richards et al. |
| 2014/0143347 A1 | 5/2014 | Murarka et al. |
| 2014/0156744 A1 | 6/2014 | Hua et al. |
| 2014/0157145 A1 | 6/2014 | Bush et al. |
| 2014/0162598 A1 | 6/2014 | Villa-Real |
| 2014/0172565 A1 | 6/2014 | Alon et al. |
| 2014/0172845 A1 | 6/2014 | Rabe et al. |
| 2014/0244619 A1 | 8/2014 | Doroshenko et al. |
| 2014/0358947 A1 | 12/2014 | Hong et al. |
| 2015/0039582 A1 | 2/2015 | Liutikas et al. |
| 2015/0278346 A1 | 10/2015 | Aiello et al. |
| 2016/0070790 A1 | 3/2016 | Bhat et al. |
| 2017/0148055 A1 | 5/2017 | Boothroyd et al. |
| 2018/0367483 A1 | 12/2018 | Rodriguez et al. |
| 2019/0205743 A1 | 7/2019 | Jiang et al. |
| 2019/0243916 A1 | 8/2019 | Ashoori et al. |
| 2019/0362263 A1 | 11/2019 | Harris et al. |
| 2019/0392396 A1 | 12/2019 | Liu et al. |
| 2020/0143288 A1 | 5/2020 | Eisenzopf |
| 2020/0175964 A1 | 6/2020 | Eisenzopf |
| 2020/0186362 A1 | 6/2020 | Thubert et al. |

OTHER PUBLICATIONS

Solis, "Micro Disruption Theory and the Social Effect", SocialMediaToday, Mar. 26, 2009, 8 pages.

\* cited by examiner

FIG. 2

MESSAGE TABLE 200

| MESSAGE ID 202 | AUTHOR ACCOUNT ID 204 | MESSAGE CONTENT 206 | RELEVANT PARTICIPANT(S) ACCOUNT ID 208 | IN REPLY TO 210 |
|---|---|---|---|---|
| 1 | @adam | I hate football | none | none |
| 2 | @joseph | real talk | none | 1 |
| 3 | @brian | How can you say that? | @adam | 2 |
| .... | .... | .... | .... | .... |

FIG. 3

ACCOUNT DATA TABLE
300

| * | ACCOUNT ID | DISPLAY NAME | FOLLOWED BY |
|---|---|---|---|
| | 302 | 304 | 306 |
| 310 | @keith | Keith Jones | @brian, @adam |
| 312 | @adam | Adam Doe | @brian, @carrie, @david, @keith |
| 314 | @carrie | Carrie Barnes | @brian, @adam |
| 316 | @david | David Swenson | @brian |
| 318 | @brian | Brian James | @david, @adam, @carrie, @keith |
| 320 | @whatsupxxx | What's Up Marketing, LLC | @adam, @george, @paul |
| 322 | @joseph | Joseph Lauer | @adam, @ashish |
| 324 | @ashish | Ashish Pahal | @john, @carrie |

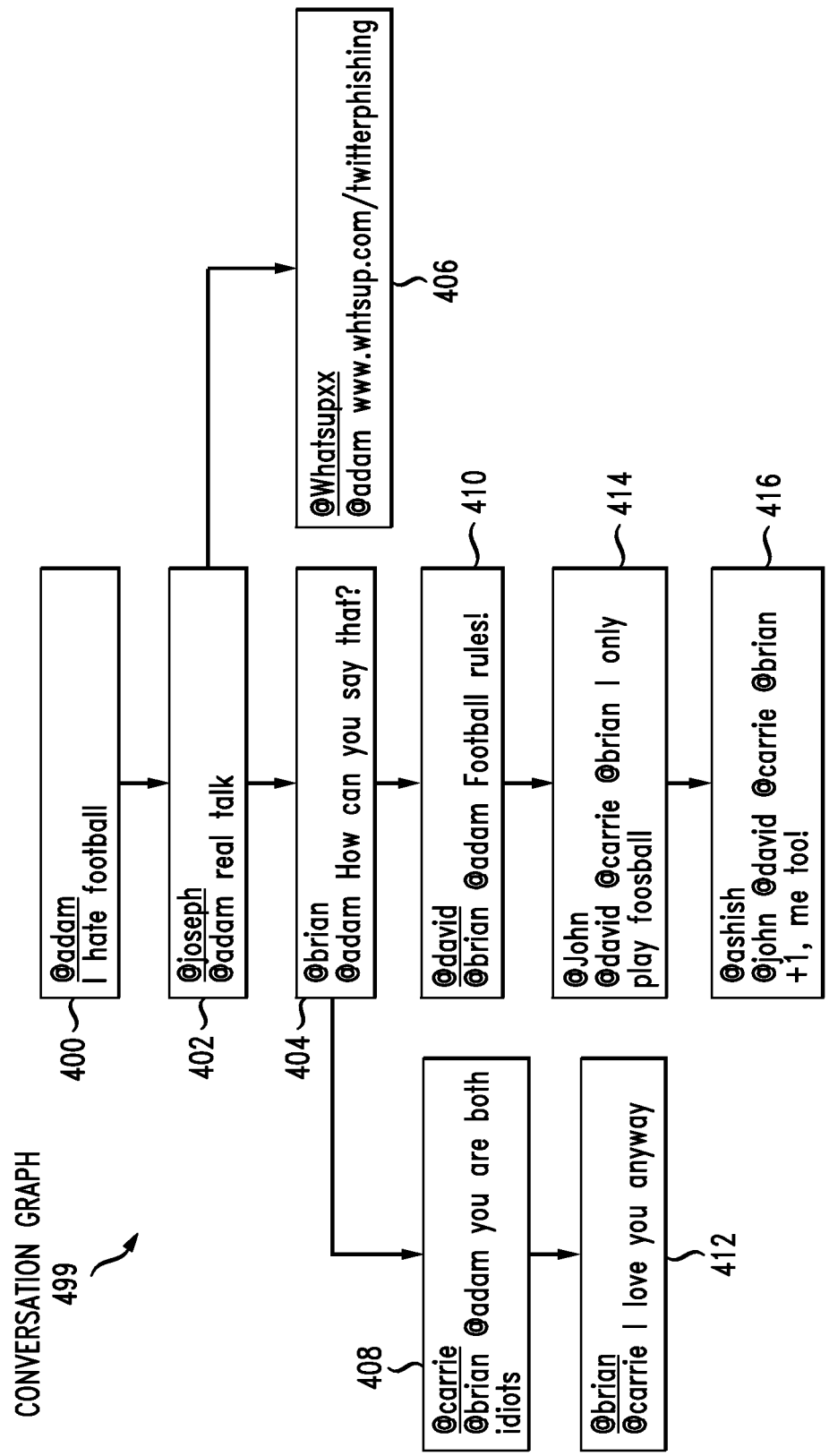

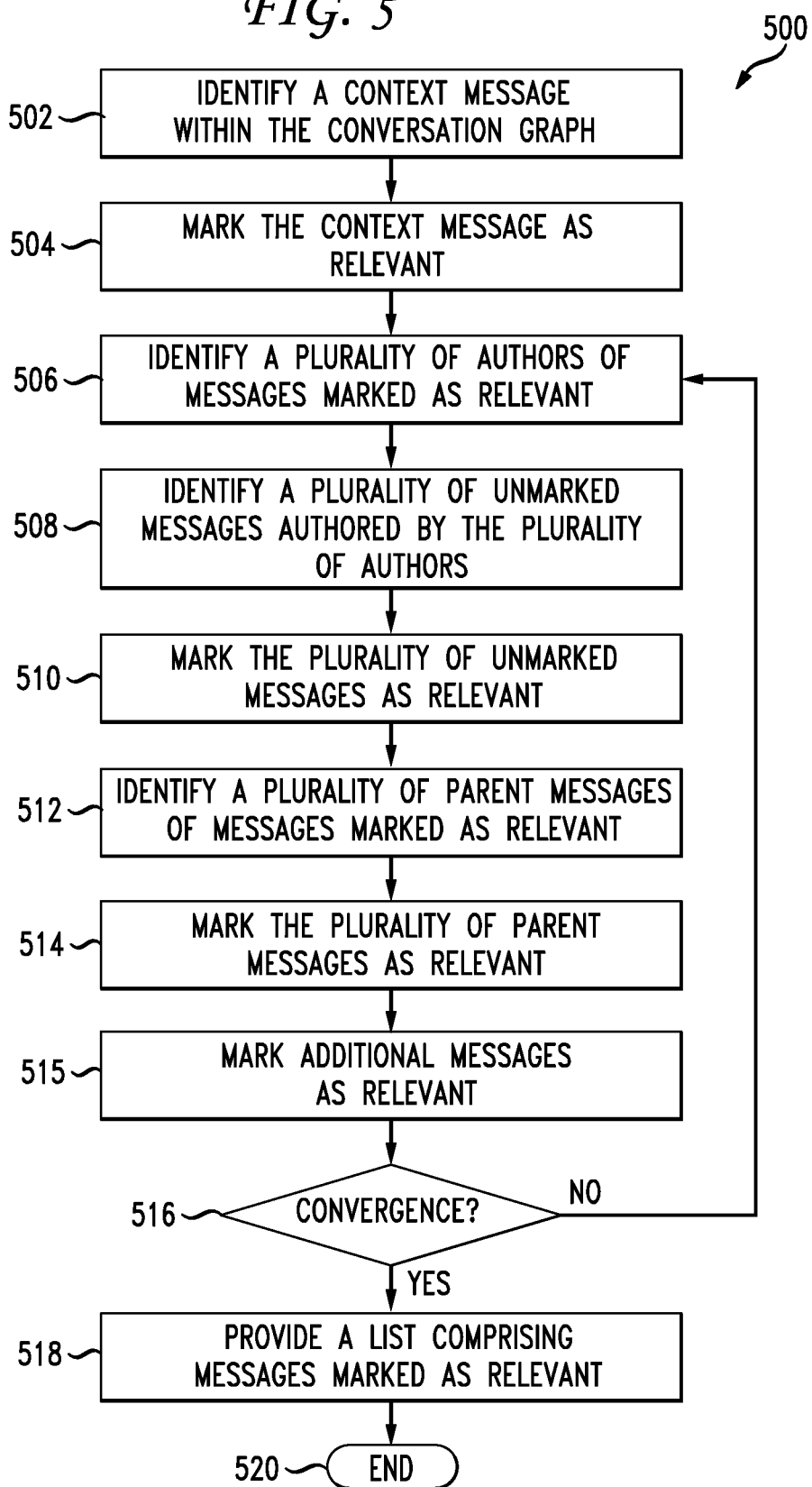

IDENTIFYING RELEVANT MESSAGES IN A CONVERSATION GRAPH

CROSS-REFERENCE TO RELATED APPLICATIONS

This application is a continuation of, and claims priority to, U.S. patent application Ser. No. 16/298,799, filed on Mar. 11, 2019, which is a continuation of U.S. patent application Ser. No. 14/824,015, filed on Aug. 11, 2015, now U.S. Pat. No. 10,229,218, which is a continuation of U.S. patent application Ser. No. 13/736,634, filed on Jan. 8, 2013, now U.S. Pat. No. 9,143,468, and related to U.S. patent application Ser. No. 13/770,955, filed on Feb. 19, 2013, now U.S. Pat. No. 9,449,050, and to U.S. patent application Ser. No. 14/020,447, filed on Sep. 6, 2013, now U.S. Pat. No. 9,418,117, all of which are incorporated herein by reference in their entirety.

BACKGROUND

The present disclosure relates generally to message presentation, and more particularly to conversation graph pruning.

Social networking services allow users to author and share messages with multiple users. For example, a first user can author and publish a message for other users to read. The messages can be any of a variety of lengths which may be limited by a specific messaging system or protocol. For example, a short messaging service protocol typically limits messages to 140 characters in length.

Users interested in viewing messages authored by a particular user can choose to follow the particular user. A first user can follow a second user by identifying the second user as a user the first user would like to follow. After the first user has indicated that they would like to follow the second user, the first user will be provided with messages authored by the second user. Users can choose to follow multiple users. Users can also respond to messages and thereby have conversations with one another. Both unidirectional (e.g., follower/followee) and bidirectional (e.g., friendship) relationships may exist, depending on the type of network.

A conversation consists of a root message, messages in reply to the root message, messages in reply to the messages in reply to the root message, etc. A conversation graph is a data structure which includes all messages in a conversation. Users can view an entire conversation based on messages included in the conversation graph. Messages in the conversation can be displayed to a user in a variety of ways. For example, all messages in a conversation can be displayed in a list ordered based on the time each message was sent. However, when a conversation comprises a large number of messages, the number of messages displayed can be very large and may overwhelm the user.

SUMMARY

In one or more embodiments, a method for identifying relevant messages in a conversation graph includes identifying a context message within the conversation graph. The context message is marked as relevant and additional messages are marked as relevant based on various criteria. A plurality of authors of messages marked as relevant is identified. A plurality of unmarked messages authored by the plurality of authors is also marked as relevant. In addition, a plurality of parent messages of messages marked as relevant is identified and marked as relevant. A list comprising messages marked as relevant is then provided to a user.

In one or more embodiments, several of the steps described above are repeated until convergence and then the list is provided to a user.

Prolific authors can be identified and messages authored by prolific authors can be marked as relevant. Similarly, credible authors can be identified and messages authored by credible authors can be marked as relevant. Users mentioned in a message, but not identified as a sender, can be identified as relevant users. Messages authored by relevant users can be marked as relevant.

In one or more embodiments, a root message of the conversation graph is marked as relevant prior to the identification of the plurality of authors. In one or more embodiments, the context message is the root message of the conversation graph. In another embodiment, the context message is identified by a user via a user selection. A relevant conversation, in one or more embodiments, comprises marked messages from the conversation graph.

A system and computer readable medium for identifying relevant messages in a conversation graph are also described.

These and other advantages of the invention will be apparent to those of ordinary skill in the art by reference to the following detailed description and the accompanying drawings.

BRIEF DESCRIPTION OF THE DRAWINGS

FIG. 2 depicts a message table in accordance with one or more embodiments of the invention.

FIG. 3 depicts an account table in accordance with one or more embodiments of the invention.

FIG. 4 depicts a graphical representation of an example conversation graph in accordance with one or more embodiments of the invention.

FIG. 5 depicts a flowchart of a method for identifying relevant messages in accordance with one or more embodiments of the invention.

DETAILED DESCRIPTION

A messaging platform facilitates viewing of messages by users. Messages can be viewed in a variety of ways. For example, all messages associated with a particular account can be viewed by a user. Messages can also be viewed based on relationships between messages. In one or more embodiments, a user can view one or more messages included in a conversation graph. A conversation graph is a data structure which includes all messages in a conversation. In one or more embodiments, a conversation graph is a data structure comprising a root message and one or more messages in reply, directly or indirectly, to the root message. A root message is a message which is identified as being not in reply to any other message. A user can also view messages related to a particular message selected by a user, wherein the particular message selected is referred to as a context message. The messaging platform receives, stores, and delivers messages to and from users.

It should be noted that messages are associated with a particular account which may be associated with an individual user or an entity such as a business or service. For example, a news service may have an account which is modified by one or more users. In this example, the account is associated with the news service and not a particular user.

In one or more embodiments, various criteria and algorithms are used in order to identify relevant messages in a conversation graph. A subset of the messages in the conversation graph may be marked as relevant in accordance with methods described herein based on one or more context data items (e.g., a context message). For purposes of this disclosure, this subset of relevant messages may be referred to as a relevant conversation. Any portion of a relevant conversation may be returned in response to a request for relevant messages.

Figure 1:
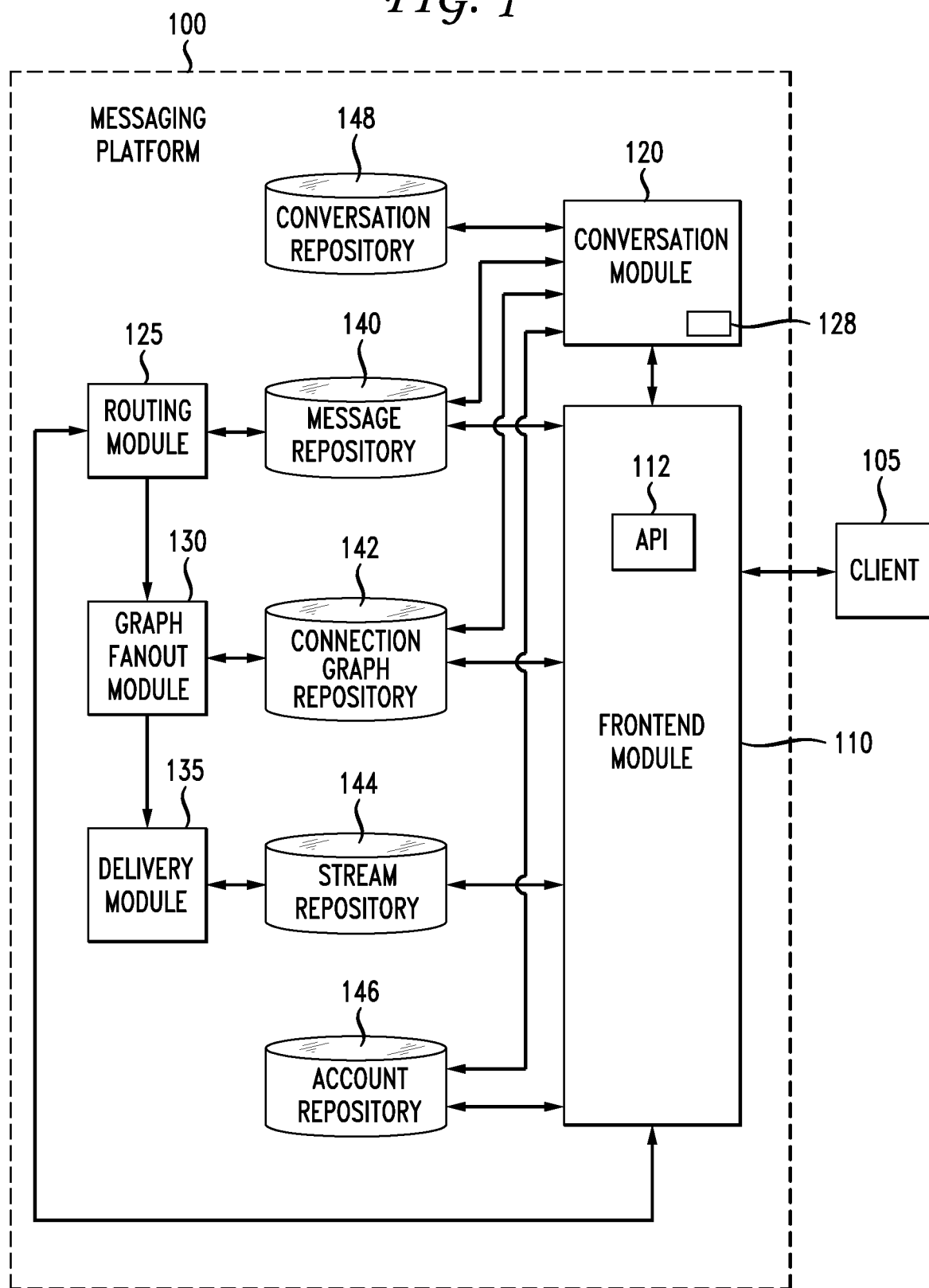
FIG. 1 depicts a diagram of a messaging platform in accordance with one or more embodiments of the invention.

FIG. 1 depicts a diagram of a messaging platform 100 according to one embodiment. Messaging platform 100 includes a routing module 125, a graph fanoutmodule 130, a delivery module 135, conversation repository 148, message repository 140, connection graph repository 142, stream repository 144, account repository 146, conversation module 120, including a semantic analysis module 128, and a front end module 110 including an API module 112.

In one or more embodiments, routing module 125 includes functionality to receive one or more messages, assign a message identifier (referred to as a message ID) to each message, and store the message(s) and message ID(s) in message repository 140. In one embodiment, routing module 125 also includes functionality to determine an identification of a sender of each message and transmit the identification of the sender to graph fanoutmodule 130.

In one or more embodiments, graph fanoutmodule 130 includes functionality to receive an identification of the sender (i.e., a particular account via which a user is sending a message) of a message, retrieve user graph data (i.e., information pertaining to a user as described in further detail below) from connection graph repository 142, and/or determine which accounts should receive the message. User graph data, for example, can identify which accounts in the messaging platform are "following" the particular account, and are therefore subscribed to receive messages from the particular account. User graph data may include any type of unidirectional (e.g., follower, subscription, etc.) and/or bidirectional (e.g., friendship, etc.) relationships among accounts. Connection graph repository 142 stores user graph data and transmits information to graph fanoutmodule 130 including a list of accounts associated with (e.g., following, friends with, subscribed to, etc.) the particular account in response to a request from graph fanoutmodule 130.

In one or more embodiments, delivery module 135 includes functionality to receive the list of accounts from graph fanoutmodule 130 and/or the message identifier generated by routing module 125. In response to receipt of this information, delivery module 135 can insert the message identifier into stream data stored in stream repository 144. In one or more embodiments, stream repository 144 stores content (e.g., message identifiers) received from delivery module 135 and/or responds to requests for information received from, for example, front end module 110 or conversation module 120. Stream data stored in stream repository 144 can make up one or more streams associated with one or more accounts of the messaging platform 100. A stream may include a dynamic list of messages associated with one or more accounts and/or can reflect any arbitrary organization of messages that is advantageous for the user of an account.

In one or more embodiments, account repository 146 includes functionality to receive, store, and/or transmit data concerning accounts. For example, account repository 146 may be configured to store information related to accounts such as contact information, location information (e.g., an address), and etc. Account repository 146, as shown in FIG. 1, is in communication with front end module 110 and conversation module 120.

In one or more embodiments, conversation module 120 includes functionality to identify one or more relevant conversations based on a conversation graph. For example, conversation module 120 may be configured to perform the functions described herein in connection with FIG. 5 and/or to receive requests from a user via front end module 110. In one embodiment, relevant conversations determined by conversation module 120 are stored in conversation repository 148. Conversation repository 148 also includes functionally to transmit relevant conversations, and/or a list of messages from a relevant conversation, in response to requests from, for example, conversation module 120 or front end module 110 via conversation module 120. Semantic analysis module 128, in one or more embodiments, is included in conversation module 120. In other embodiments, semantic analysis module 128 may be a module separate from conversation module 120. Semantic analysis module 128 includes functionality to identify one or more topics associated with messages, accounts, and/or conversations as described in further detail below.

Front end module 110, in one or more embodiments, includes functionality to transmit and receive information from one or more clients (e.g., client 105). Front end module 110 includes functionality to serve message streams via interaction with various modules such as conversation module 120. In one embodiment, the functionality described in conjunction with front end module 110 is contained in API module 112. Front end module 110 is in communication with client 105 which, in one embodiment, is used an end point as described below.

An overview of the operation of messaging platform 100, in accordance with various embodiments of the invention, is as follows.

In one or more embodiments, client 105 includes functionality to compose one or more messages in response to user input. For example, a user associated with a particular account can author a message to be sent from any entry point (e.g., client 105). In general, the entry point can be based on the operation of any computing device, for example, a mobile phone, a personal computer (laptop, desktop, or server), or a specialized device having communication capability. The entry point can utilize any of a number of interfaces including a web-based client, a Short Messaging Service (SMS) interface, an instant messaging interface, an email-based interface, an API function-based interface, etc. The entry point may be configured to transmit the message through a communication network to messaging platform 100.

In one or more embodiments, routing module 125 receives the message and, in response, stores the message in message repository 140. The message is assigned an identifier referred to as a message ID which is stored along with the message in message repository 140. Routing module 125 may be configured to store an identification of a sender (e.g., an account ID associated with an individual or an account associated with a non-human entity such as a business or service) along with the message in message repository 140.

In one or more embodiments, the identification of the sender is passed to graph fanoutmodule 130 which, in response, retrieves user graph data from connection graph repository 142. User graph data contains information indicating which accounts are associated with (e.g., following) a particular account, and are therefore subscribed to receive messages or indications regarding messages sent by a user via the particular account. In one embodiment, the sender of the message does not specify recipients when posting the message to the messaging platform 100. Graph fanoutmodule 130 uses the user graph data to determine which accounts associated with the messaging platform 100 should receive the message. In one embodiment, delivery module 135 receives a list of accounts (from graph fanoutmodule 130) and the message identifier (generated by routing module 125).

In one or more embodiments, delivery module 135 inserts the message identifier into one or more message streams associated with each account identified in the list of accounts. The message streams are stored in stream repository 144. A message stream, in one or more embodiments, comprises messages associated with a particular account. For example, the home message stream of each account can include all messages posted by followed or friendedaccounts. In one or more embodiments, the frontend module 110 includes functionality to create one or more message streams in response to user input. For example, a user may select any number of accounts to be included in a given stream. The stream will then display only messages posted by the selected accounts. Message streams can reflect any organization of the messages that can be advantageous for a user of an account on messaging platform 100.

In one or more embodiments, front end module 110 uses storage modules 140, 142, 144 for serving messages to a user of an account on messaging platform 100. In one or more embodiments, stream repository 144 is accessed by front end module 110 to identify a particular message stream. Messages identified by a particular message stream can then be retrieved from message repository 140. Message streams can be constructed using information from connection graph repository 142 and stored in stream repository 144.

Similar to the entry point, a user can use any end point (e.g., client 105) to receive one or more messages. The end point can also be any computing device providing one or more of a number of interfaces. For example, when the user uses a web-based client to access their messages, front end module 110 can be used to serve one or more message streams to the client. Where the user uses a client that accesses messaging platform 100 through an API (application programming interface), API module 112 can be utilized to serve one or more message streams to the client for presentation to the user. Similarly, different forms of message delivery can be handled by different modules in front end module 110 (e.g., by additional modules not shown). The user can specify particular receipt preferences which are implemented by modules in front end module 110.

Messages, in one or more embodiments, are stored in message repository 140. FIG. 2 depicts an example of a message table 200 which includes multiple records (e.g., 212, 214, 216) containing message data fields 202-210 associated with a message identified by message ID 202. Author Account ID field 204 contains an identifier indicating an account associated with an author of the message identified by message ID 202. In one or more embodiments, each account is associated with a unique account ID. For example, a user named Adam Smith may select the identifier "@adam." Other identifiers, such as alpha-numeric identifiers, can be selected as well. Message content 206 contains the content of a message identified by message ID 202 field. Typically, the content of a message consists of text. However, in one or more embodiments of the invention, message content can contain various media and/or may include one or more references to various media (e.g., a uniform resource locator (URL) of a video).

In one or more embodiments, relevant participant(s) account ID 208 field contains identifiers of one or more relevant accounts. In one embodiment, the relevant participant(s) account ID 208 excludes the authoring account and/or the parent account (i.e., the author of a message which the message is in reply to) if the message is a reply message. For example, message content 206 can contain text such as "@johnqpublic is correct!". The character string "@johnqpublic" indicates that an account associated with the "@johnqpublic" identifier is mentioned in the content of the message. The mentioned account identifier ("@johnqpublic") is inserted into relevant participant(s) 208 field. Identified relevant participants can then be used as a factor in determining which messages in a conversation graph to surface to one or more users (i.e., which messages to include in a relevant conversation).

In one or more embodiments, the conversation module of FIG. 1 includes functionality to identify relevant participants. Relevant participants may be identified based on a variety of different data. For example, relevant participants may be tagged by the user during composition of the message and may be stored as metadata associated with the message (i.e., not within the message content). In another example, relevant participants may be explicitly tagged within the content of the message, as in the example discussed above (e.g., "@johnqpublic is correct!"). Lastly, in yet another example, relevant participants are inferred based on text or data within the content of the message (e.g., facial recognition, display name matching, etc.) In other words, in one or more embodiments, a relevant participant can be identified based on a character string of text which is not explicitly tagged as an account identifier (e.g., not preceded by the "@" symbol). For example, a user may be identified by the user's real name. If the user's real name can be found in display name column 304 of FIG. 3 (described in further detail below), then that user's account ID can be inserted into relevant participant(s) Account ID 208 field of an appropriate record.

In one or more embodiments, in reply to field 210 identifies a parent message that a particular message is in reply to. For example, record 214 identifies message ID number 2 which is identified as being in reply to message ID number 1. The relationships among messages may be used to identify various messages for inclusion in a conversation graph. The reply relationships between two or more messages may be identified based on a variety of different data, in accordance with various embodiments. In one or more embodiments, the reply structure is identified based on metadata associated with each message which is received from a client used to compose the message. For example, a user may click on a "Reply" link displayed below a message displayed in the user's home stream. The client may then display a message composition box for drafting a reply message. The client may submit metadata including the reply relationship (i.e., a message ID of the parent message) with the reply message. Conversely, in another example, the reply relationship may be explicitly defined by the user within the message content. In this example, the reply structure may be identified by identifying one or more account IDs and/or message IDs mentioned within the message content. The designation between authors of parent messages and relevant participants, if any, may be made based on any number of syntactical rules. Thus, the message platform 100 may require that if a message begins with an account ID (e.g., "@john"), the message will be marked as being in reply to a latest message from the mentioned account ID. Thus, the reply to field 210 may be populated based on any means of identifying a reply structure of two or more messages. Lastly, it should be noted that while many of the examples depicted herein include a requirement that each message can only have one parent message, embodiments of the invention may be implemented in a system allowing multi-parent reply structures (i.e., a single message being in reply to two or more parent messages).

Connection graph data, in one or more embodiments, is stored in connection graph repository 142. Connection graph data, in one embodiment, reflects which accounts in messaging platform 100 are associated with (e.g., following, friends with, subscribed to, etc.) a particular account and are, therefore, subscribed to receive status messages from the particular account. Connection graph data can also reflect more sophisticated graph relationships between the accounts. FIG. 3 depicts account data table 300 which includes multiple records 310-324 containing user data 304-306 associated with an account identified by account ID 302. Account ID field 302 contains an identifier which uniquely identifies each account of the messaging platform 100. In one embodiment, the account ID is selected by a user. Although many users may choose to select an account ID that is a concatenation of the user's first and last name, or the name of a business or service, account ID can be an arbitrary alpha-numeric string. Display name 304 contains an identifier indicating a user's name. In one or more embodiments, display name 304 is a character string, typically chosen by a user and comprising the user's actual name. In other embodiments, display name 304 may be a business name, a pseudonym, and/or any other display name selected by a user of the account. Each display name 304 is associated with a particular account ID 302. In one or more embodiments, user names and account IDs are used to facilitate recognition of authors by readers and are used by messaging platform 100 to perform various functions.

In one or more embodiments, followed by field 306 contains identifiers indicating accounts following an account identified by account ID 302. In one or more embodiments, a user can choose to follow another account. A user following a particular account receives messages authored by a user associated with the particular account intended for public viewing. For example, if the user associated with the particular account enters a message for public viewing, all users following the particular account can view the message. In one or more embodiments, users following the particular account will receive a push notification (on their computing device) indicating that a user associated with the particular account has posted a message. In one or more embodiments, users following the particular account will receive a copy of the message the user of the particular account authored for public viewing. For example, FIG. 3 shows that account "@adam" is followed by "@keith", "@brian", "@carrie", and "@david". As such, "@keith", "@brian", "@carrie", and "@david" are subscribed to receive messages authored by a user associated with the account "@adam". In one or more embodiments, followed by field 306 is implemented as a bidirectional relationship field (e.g., friendship) and represents a mutual connection between accounts of the messaging platform.

Message repository 140 can be used to generate message streams comprising lists of messages for presentation to a user based on various criteria. For example, a message stream can contain a list of messages from accounts that a particular account is associated with (e.g., following, friends with, etc.).

Message stream data, in one or more embodiments, is stored in stream repository 144.

FIG. 4 is an example depiction of a conversation graph 499 comprising messages 400 through 416. A conversation graph is a data structure including messages of a conversation. In one or more embodiments, the conversation graph includes a root message (e.g., message 400 of FIG. 4) and one or more messages connected, either directly or indirectly, to the root message (e.g., messages 404-416 of FIG. 4). The relationships between the nodes of the conversation graph represent a reply structure of the conversation, wherein each child node is a reply message to at least one corresponding parent node, in accordance with various embodiments of the invention. The author of a message is shown underlined in FIG. 4. For example, the author of message 400 is associated with the account "@adam" as identified by the underlining. Messages 400-416 correspond to message data stored in table 200 of FIG. 2. For example, record 212 of table 200 is identified in message ID field 202 as message "1" which corresponds to message 400 depicted in FIG. 4. Record 214 of table 200 is identified in message ID field 202 as message "2" which corresponds to message 402 in FIG. 4. Record 216 of table 200 is identified in message ID field 220 as message "3" which corresponds to message 404 in FIG. 4.

It should be noted that messages can be categorized into various types. For example, a message posted by a particular author without an indication that the message is directed to a particular account may be referred to, in one embodiment, as a broadcast message or simply a message. Broadcast messages are displayed to users with accounts associated with (e.g., following, friends with, etc.) the account of the broadcast message. A message in reply to another message is considered a reply message or, more simply, a reply. In one embodiment, the category of a message determines whether the message will be designated to be displayed to another account or included in other account's message streams.

A direct message (also referred to as a private message) is a message that explicitly identifies one or more accounts as recipients. For example, a message from a user associated with the account @keith that is explicitly directed (by the user authoring the message) to the account @carrie is considered a direct message from @keith to @carrie.

Although conversation graph 499 is depicted in FIG. 4 using a graphical format, the messages depicted in FIG. 4, in one or more embodiments, are stored in message repository 140 in any appropriate data structure. Message 400, in this example, is a root message (i.e., the parent of all messages shown in FIG. 4). Child message 402 is a reply message that is in reply to message 400 as identified by the line connecting message 402 to message 400. Child messages 404 and 406 are reply messages that are in reply to message 402, the relationships of which are shown by the lines connecting the messages. In this example, messages 402-416 are reply messages under root message 400.

Conversation graph 499, in one embodiment, is determined based on the reply structure of messages 400-416.

The reply structure may be identified based on metadata associated with each message and/or reply information identified from within the message content, in accordance with various embodiments. For example, in one embodiment, metadata stored in the In Reply to field 210 of table 200 is used to generate a conversation graph. More specifically, the metadata maintains the reply relationships between multiple messages of a conversation. Thus, in this example, each message can be in reply to only one parent message, and only messages which are in the reply chain of the root message are included in the conversation graph. It should be noted that displaying messages solely from accounts having a predefined graph relationship with a user's account may render the conversation incomprehensible to the user.

FIG. 5 depicts a flow chart of a method for identifying relevant messages in a conversation graph. In one or more embodiments, some or all of the functionality for performing the method depicted in FIG. 5 resides in conversation module 120. While the various steps in this flowchart are presented and described sequentially, one of ordinary skill will appreciate that some or all of the steps may be executed in different order and some or all of the steps may be executed in parallel. Further, in one or more embodiments of the invention, one or more of the steps described below may be omitted, repeated, and/or performed in a different order. Accordingly, the specific arrangement of the steps shown in FIG. 5 should not be construed as limiting the scope of the invention.

At step 502, a context message is identified. A context message may be any one of the messages in a conversation graph. In one or more embodiments of the invention, the context message can be used to identify a context of a request for a relevant messages. Examples of a context message may include, but are not limited to, a message selected by a user, a message including a specified keyword or topic, a message returned in response to a search request, a message associated with an advertisement, and/or any other message included in at least one conversation graph. In one or more embodiments, the context message is identified based on a user selecting a message from a message stream presented via front end module 110. In other embodiments, the context message may be identified as a message including a specified keyword or topic, a message returned in response to a search request, and/or a message associated with an advertisement.

At step 504, the context message is marked as relevant. Marking a message as relevant, in one or more embodiments, may comprise adding a message ID of the message to a list of relevant messages. In one or more embodiments, the list of relevant messages is stored as part of a relevant conversation in conversation repository 148 (shown in FIG. 1). Additional messages may be marked as relevant based on one or more of the following criteria and/or algorithms.

In one or more embodiments, the conversation graph is truncated, prior to performing steps 506-518, to include only (1) the root message, (2) the context message, (3) all messages connecting the root message to the context message, and (4) all direct or indirect children of the context message. In this way, the conversation graph is modified to include only a single branch of messages connecting the root message to the context message, as well as any number of branches below the context message.

At step 506, a set of authors of messages marked as relevant is identified. It should be noted that some steps of flowchart 500 will be repeated as described below. As such, although step 506 indicates that a set of authors of messages marked as relevant is identified, the first execution of step 506 may result in only a single author being identified (i.e., the author of the context message). In the first execution of step 506, the author of the context message is identified as one of the set of authors of messages marked as relevant since the context message is marked as relevant.

At step 508, a plurality of unmarked messages authored by the set of authors is identified. For example, messages in the conversation graph authored by one of the set of authors from step 506 are identified. At step 510, the unmarked messages authored by the set of authors is marked as relevant.

At step 512, parent messages of messages marked as relevant are identified. A parent message of a particular message is a message to which the particular message is in reply. For example, if message 410 depicted in FIG. 4 is marked as relevant, message 404 would be identified as relevant as well since message 410 is depicted as being the child of message 404 indicating that message 410 is in reply to message 404 (i.e., message 404 is a parent message of message 410). At step 514, the parent messages are marked as relevant.

Optionally, at step 515, additional messages are marked as relevant based on various criteria and algorithms described below. In one or more embodiments, step 515 occurs after step 516 and, thus, is only performed one time. In other embodiments, step 515 is part of the iterated portion of the method and is performed multiple times.

At step 516, it is determined whether convergence has occurred. In one or more embodiments, convergence occurs when execution of steps 506-514 (or, alternatively, 506-515) result in no additional messages for a particular conversation being marked as relevant. Alternatively, in one or more embodiments, convergence is deemed to occur after a fixed number of iterations of steps 506-514 (or, alternatively, 506-515). If convergence has not occurred, the method proceeds to step 506. If convergence has occurred, then the method proceeds to step 518.

At step 518, a list comprising the messages marked (e.g., identified) as relevant is provided. In one or more embodiments, the list is presented to a user in a web page via front end module 110. At step 520, the method ends. For example, the list of relevant messages can be presented to a user in an in-line expansion of a message stream, in response to the user expanding or otherwise engaging with a context message (e.g., clicking on a "view conversation" hyperlink). Alternatively, in another example, in response to selecting an option to view the relevant messages, the user may be redirected from the message stream to a separate pane, page, or window which includes the relevant messages. Any user interface for displaying or expanding messages may be used, in accordance with various embodiments of the invention.

In one or more embodiments, one or more relevant conversations are determined each time a particular user request input is received and the response to the user request input is not saved. In another embodiment, relevant conversations determined by conversation module 120 are stored in conversation repository 148 for retrieval when messages from the same relevant conversation are requested by a user. For example, a relevant conversation determined by conversation module 120 can be stored in conversation repository 148 in any appropriate data structure.

In one or more embodiments of the invention, the list of relevant messages is sorted in chronological order of the time the relevant messages were posted to the messaging platform. The list may include an identifier designating the context message.

In one or more embodiments of the invention, the list of relevant messages is smaller than the relevant conversation. Thus, a predefined number of the relevant messages are returned in response to the request for relevant messages. A subset of an already calculated relevant conversation may be selected for inclusion in the list, or the process of selecting relevant messages (e.g., the process described in FIG. 5) may be terminated upon identifying the predefined number of relevant messages. In one or more embodiments, the relevant messages which are chronologically the closest to the context message are selected for inclusion in the list of relevant messages. Thus, for example, if 11 relevant messages are required for a request, the list of relevant messages can include 5 messages posted prior to the context message and 5 messages posted after the context message. In one or more embodiments, a first predefined number of messages can be defined for messages chronologically preceding the context message and a second predefined number of messages may be defined for messages chronologically succeeding the context message. Thus, for example, conversation module 120 can be configured to return a list of relevant messages including 3 preceding messages and 5 succeeding messages. Any combination of preceding and/or succeeding messages can be used, in accordance with various embodiments of the invention.

In one or more embodiments, the size of the list of relevant messages can be dependent on additional context data associated with a request for relevant messages. Examples of additional context data can include, but are not limited to, client information (i.e., information regarding a client which originated the request for the relevant conversation), client platform data (e.g., operating system, version, etc.), client view information (e.g., identification of the pane/page/view in which the relevant conversation will be displayed), and any other data relevant to the request for the relevant conversation. Thus, for example, conversation module 120 can be configured to return a smaller number of relevant messages (i.e., based on a smaller predefined number of messages for a request) for requests from a particular mobile client. Thus, it may be advantageous to increase or decrease the number of relevant messages based on one or more client restrictions or requirements (e.g., limited display area on mobile devices).

In one or more embodiments, conversation module 120 is configured to receive a request for additional relevant messages. Conversation module 120 then returns an additional list of relevant messages from the relevant conversation. In one or more embodiments, the entire relevant conversation is stored in conversation repository 148 and only a portion of the relevant conversation is returned depending on the given request. For example, a list of 10 relevant messages may be returned in response to a request from a mobile client. In this example, the relevant conversation is displayed to the user along with an option to expand the conversation upward or downward. Upon receiving a selection of the option to expand the conversation downward, the client submits a request for 5 additional relevant messages, and conversation module 120 identifies and returns the additional 5 relevant messages (i.e., either by identifying the messages in a cached relevant conversation or by performing the process of selecting additional messages from the conversation graph).

Various additional criteria can be used to identify relevant messages in a conversation graph as represented at step 515 in FIG. 5. The additional criteria described below may be used to mark additional messages in a conversation as relevant messages based on auxiliary considerations.

In one or more embodiments, relevant participants may be identified based on the current list of messages marked as relevant. Relevant participants may be identified, for example, based on a relevant participant(s) account ID field of a message table (e.g., relevant participant(s) account ID 208 of FIG. 2, discussed above). In this example, all messages from the newly identified relevant participants may be marked as relevant. In one or more embodiments of the invention, all accounts associated with (e.g., followed by, friends with, etc.) the requesting account (or another account associated with a request for relevant messages) are marked as relevant. Messages by the associated accounts are then marked as relevant messages. In other embodiments, only associated accounts with a minimum number of followers, credibility rating, or other attribute are marked as relevant.

In one or more embodiments, in order to prevent gaps in the relevant conversation, additional messages are identified. For example, in one or more embodiments of the invention, a shortest path may be identified between a particular marked message and a closest marked message in the conversation graph. In this example, all messages in the shortest path (up to a predefined maximum number of messages) are marked. In one or more embodiments of the invention, any message in the shortest path may be marked based on a predefined criteria or algorithm. For example, a message at a mid-point of the shortest path may be marked. In the shortest path, a predefined number of the most-favorited messages, most-rebroadcasted messages, messages from authors with the highest credibility, messages from the most-prolific authors, and/or messages identified using any combination of criteria may be marked, in accordance with various embodiments of the invention. In one or more embodiments of the invention, a most relevant path between a marked message and a next closest marked message in the conversation graph are identified. A relevance score may be calculated for each node among one or more potential paths between the marked nodes. A path relevance score may be calculated based on the relevance scores of each node in the path. For example, the path relevance score may be calculated by aggregating the relevance scores of each node in the path and then multiplying the aggregate by a factor of the total number of nodes in the path. In this example, the factor will lower the path relevance score as the length of the potential path increases. Continuing the example, the potential path with the highest path relevance score is then selected and the nodes in the path are all marked. In one or more embodiments of the invention, the process of marking nodes may end after marking these additional nodes (i.e., no other nodes may be marked) or, conversely, additional iterations of the marking process may continue. Any other variation of calculating the node relevance scores and the path relevance scores may be used, in accordance with various embodiments of the invention.

In one or more embodiments, authors (i.e., users and/or accounts associated with users) that have authored more than a particular number of messages can be identified as prolific authors. Messages authored by prolific authors can be marked as relevant. In addition, messages authored by users having a credibility score above a threshold can be marked as relevant. A particular author's credibility score can be calculated algorithmically based on the particular author's relationships and/or interaction with other users. For example, if a particular user is followed by multiple high profile or prolific accounts, the particular user will typically have a high credibility score. A credibility score can be based on a qualitative indicator (i.e., low, medium, high) or a quantitative indicator, such as a value from 1 to 10.

Authors mentioned in relevant messages can be identified as relevant authors. For example a message including the character string "@johnqpublic is correct!" mentions the account "@johnqpublic". In one or more embodiments, if the message is identified as relevant, the account "@johnqpublic" will be identified as a relevant author based on the account being mentioned in the relevant message. It should be noted that a user's name (e.g. "John Public") may be used to identify an account mentioned in a message. For example, table 300 shown in FIG. 3 may be used to determine that user name "Keith Jones" in record 310 is associated with account ID "@Keith".

A particular author may also be identified as a relevant author based on the particular author identified as being associated with (e.g., followed by, friends with, etc.) an author of a context message. For example, record 310 of FIG. 3 indicates that "@adam" is followed by "@keith". In this example, "@adam" would be identified as a relevant author with respect to a context message authored by "@keith".

In one or more embodiments of the invention, messages authored by one or more users associated with one or more accounts may be deemed relevant based on context-specific data. In other words, an account may be relevant with respect to one conversation and non-relevant with respect to another conversation, depending on the context-specific data and criteria used. Examples of context-specific data may include, but are not limited to, a topic of a message, one or more keywords (e.g., denoted by a hash tag) identified in a message (e.g., a root message or context message), a conversation topic of a conversation including a message, a keyword and/or topic of a search request, and/or any other context specific data associated with a request for relevant messages. In one or more embodiments of the invention, the conversation module 120 is configured to identify a topic associated with a message (e.g., a context message of a request for relevant messages). The conversation module 120 may be configured to submit the text of the message as an input to a semantic analysis module 128.

In one or more embodiments of the invention, semantic analysis module 128 includes functionality to identify one or more topics associated with messages, accounts, and/or conversations. Semantic analysis module 128 may analyze a message based on frequency of a word, density of a word, connotations of a word, semantic equivalents of a word, sentiments associated with a word, and/or any other criteria for categorizing an account, message, or conversation. In one or more embodiments of the invention, semantic analysis module 128 includes functionality to calculate a relevance score representing a relevance of a message, account, or conversation to a topic. Semantic analysis module 128 may then provide one or more relevance scores to the conversation module in response to a request. The conversation module 120 may utilize the one or more relevance scores to determine a relevance between accounts, messages, and/or conversations. For example, the conversation module 120 may identify a high relevance of a conversation to a predefined topic. In this example, the conversation module 120 may then identify one or more authors of messages in the conversation with high relevance scores to the same predefined topic. In other words, if a conversation has a high relevance score to the topic "basketball" the conversation module 120 may identify one or more professional basketball players with messages in the conversation graph (by virtue of the fact that a basketball player's account may have a high relevance score to the topic "basketball"). In this example, the conversation module 120 then marks one or more messages authored by these high relevance authors as relevant. In one or more embodiments of the invention, one or more predefined relevance threshold values may be used to determine if the relevance score is sufficient to designate the author as a high relevance author. Any amount of further relevance analysis may be performed (e.g., based on relevance of individual messages of the high relevance authors in the conversation graph) to further reduce the number of messages marked as relevant, in accordance with various embodiments of the invention.

In one or more embodiments of the invention, the conversation module 120 includes functionality to use user graph data stored in connection graph repository 142 to determine degrees of separation between one or more accounts. Relevant authors in a conversation graph may be identified based on a predefined threshold of degrees of separation. For example, if a first account is an author of the context message and follows a second account, the second account replying to a message authored by a third account can result in the third account being identified as a relevant author. In this example, all messages in the conversation graph which are authored by relevant authors can be marked as relevant. Thus, in one or more embodiments, accounts within a predefined degrees of separation threshold (with respect to a user's account and/or an account of the context message) are marked as relevant accounts.

A message can be marked as relevant based on information related to an author of the message (i.e., the account used in authoring the message). In one or more embodiments, users can rate a particular user based on various factors such as quality of messages, popularity, etc. A rating can be assigned to the particular user based on this input. Messages from the particular user can then be marked as relevant based on the user's rating exceeding a predefined threshold rating.

In one or more embodiments, users can be verified using various criteria. For example, a particular user can be identified as a verified user in response to the user providing proof of identity. Messages by verified users can then be identified as relevant messages.

In one or more embodiments, a message can be identified as relevant with respect to a context message based on a higher than expected amount of engagement with the message (i.e., the engagement amount exceeding a predefined threshold). For example, a typical message may have one or two replies. In this example, if a message is determined to have greater than two replies, then the message can be marked as relevant based on this relatively higher than expected amount of engagement. In addition, messages may be reposted by other users or identified as being found interesting (e.g., by being "favorited", saved, or otherwise engaged with, etc.). A message which has been reposted and/or identified as being found interesting may also be identified as relevant based on the number of reposts and/or identifications.

It should be noted that, in one or more embodiments, data pertaining to users (e.g., credibility, prolificacy, etc.) can be stored in connection graph repository 142. For example, a credibility field may be added to records 310-318 of table 300 shown in FIG. 3. Similarly, data pertaining to a message (number of replies to, number of times identified as interesting, etc.) can be stored in message repository 140. For example, a "number of replies to" field can be added to the records of table 200 shown in FIG. 2.

The following section describes various examples of the invention. The examples are included to aid in the understanding of the invention but are not intended to limit the scope of the invention.

Figure 6A:
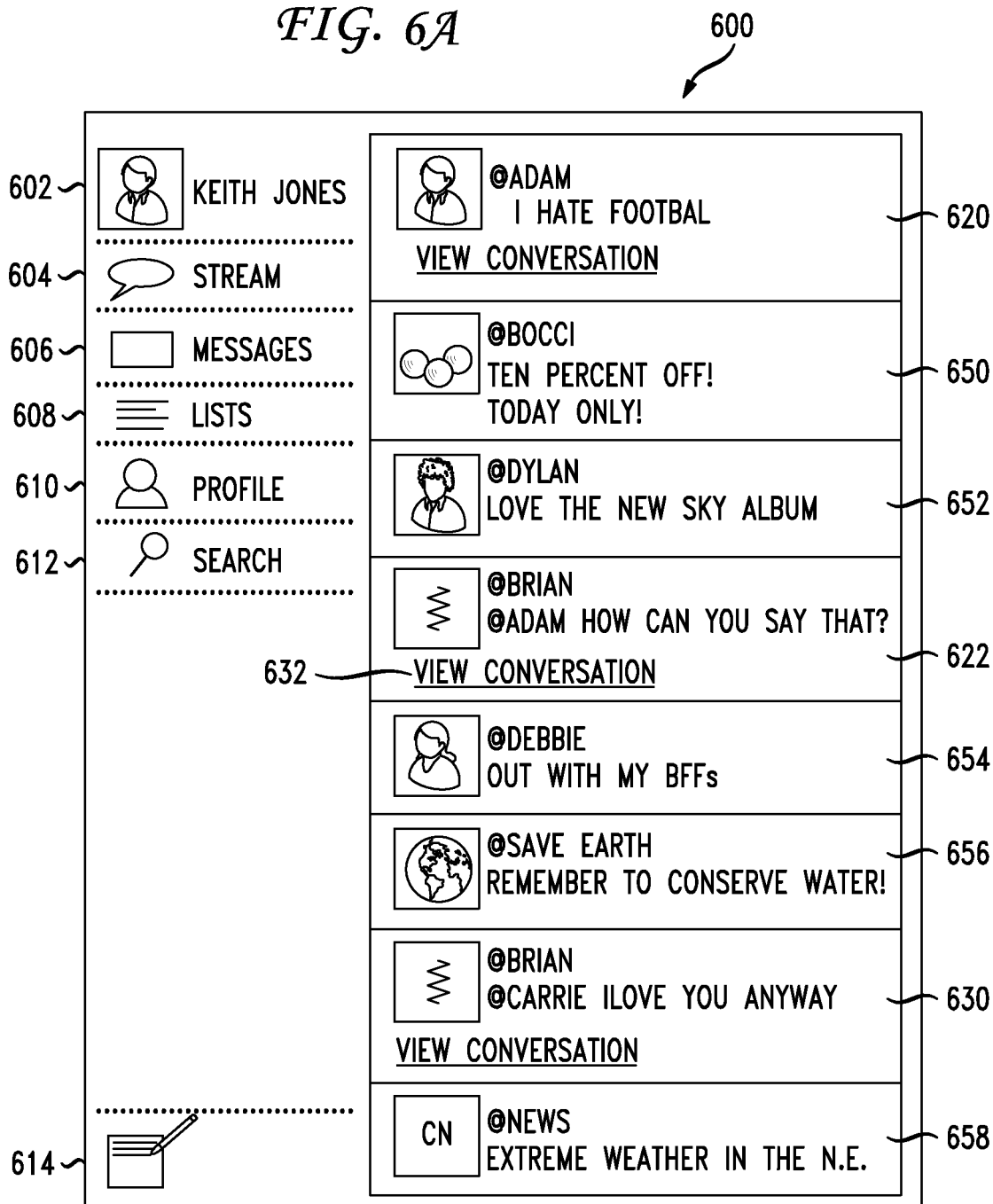
FIGS. 6A and 6B depict example user interfaces in accordance with one or more embodiments of the invention.

FIG. 6A depicts example user interface 600 according to one embodiment in which messages are displayed to a user. The particular account for which the user interface is displaying messages is identified by account field 602. Icons depicted below account field 602 pertain to functions a user can select. Stream field 604 can be selected (e.g., touching a touch screen over the icon indicating stream field 604) in order to display a home stream of messages. Messages field 606 can be selected in order to display a particular group of messages posted by the account (602). Lists field 608 can be selected in order to select a message stream corresponding to a particular list of accounts selected by the user. Profile field 610 can be selected in order to open a user interface in which a user can modify account information and settings. Search field 612 can be selected in order to search messages based on various user selected criteria. New message icon 614 can be selected in order to author a new message.

In the example of FIG. 6A, the home stream is displayed by default. Messages 620, 622, and 630 are displayed in the home stream based on account 602 ("Keith") following the accounts "@brian" and "@adam" as shown in table 300 of FIG. 3. Messages 650, 652, 654, 656, and 658 are also displayed in the home stream based on account 602 ("Keith") additionally following the accounts "@bocci", "@dylan", "@debbie", "@saveearth", and "@news" (not shown in FIG. 3). The author of each message, in one embodiment, is identified by the author's avatar followed by the author's account ID. For example, message 620 depicts a generic avatar of the author followed by the author's account ID, in this case, "@adam". Messages 620, 622, and 630 contain a view conversation link (e.g., view conversation link 632) which, in this example, is a hyperlink which indicates that relevant messages including the corresponding message can be viewed by selecting the hyperlink.

As depicted in FIG. 6A, message 620 is from account "@adam" and reads "I hate football". Message 622 is from account "@brian", is directed towards account "@adam", and reads "How can you say that?" Message 630 is from account "@brian" and is directed to account "@carrie" and reads "I love you anyway." In this example, other relevant messages which are part of the conversation are not displayed in the home stream because they are posted by accounts which are not followed by account 602. In addition, messages which do not pertain to the conversation are also displayed in the home stream (i.e., messages 650, 652, 654, 656, and 658).

Messages 620, 622, and 630 may appear to not make sense and may not provide a user reading the messages with a complete understanding of the interaction. Further, messages 650-658 can further confuse a reader since these messages are interspersed between messages 620, 622, and 630 and are not related to the conversation. Hyperlink 632 in message 622 indicates that there may be more messages in the conversation which are not included in the current stream, or are dispersed throughout the stream. In this example, messages 620, 622, and 630 of FIG. 6A are depicted as messages 400, 404, and 412 in conversation graph 499 of FIG. 4.

Continuing the example, the user selects hyperlink 632 in message 622 in order to view relevant messages. Based on the user's selection of hyperlink 632, message 622 is identified as the context message. Since message 622 corresponds to message 404 of FIG. 4, message 404 is marked as relevant based on its selection as the context message.

Continuing the example, a plurality of authors of messages marked as relevant are identified. In this example, the account "@brian" is identified as an author of a message (404) marked as relevant. A plurality of unmarked messages authored by the plurality of authors is then identified. In this example, message 412 is identified as an unmarked message authored by an author of a relevant message (i.e., the account "@brian" is the author of message 404) and is marked as relevant.

Continuing the example, a plurality of parent messages of messages marked as relevant is then identified. In this example, message 402 is identified as the parent of message 404, and message 408 is identified as the parent of message 412. Since messages 402 and 408 are identified as parent messages of messages marked as relevant, messages 402 and 408 are marked as relevant.

Continuing the example, based on the marking of messages 412, 408, and 402, it is determined that convergence has not occurred. In other words, since additional messages were marked as relevant in the last iteration of the method, convergence has not occurred. The process continues by identifying and marking unmarked messages by authors marked as relevant. In this example, no additional messages are identified from authors marked as relevant. Next, message 400 is identified as a parent message of a message marked as relevant (i.e., message 400 is the parent of message 402, which is marked as relevant) and is thus marked as relevant.

Continuing the example, it is again determined whether convergence has occurred. Since the last iteration produced a relevant message (400), convergence has not yet occurred and the process proceeds. In the final iteration, no additional messages are marked as relevant from relevant authors. Furthermore, no additional messages are marked as relevant based on being a parent message of a message marked as relevant. As such, it is then determined that convergence has occurred and a relevant conversation comprising messages marked as relevant is provided. In this example, the relevant conversation comprises messages 620, 621, 622, 626, and 630 of FIG. 6B which correspond to messages 400, 402, 404, 408, and 412 shown in FIG. 4.

Figure 6B:
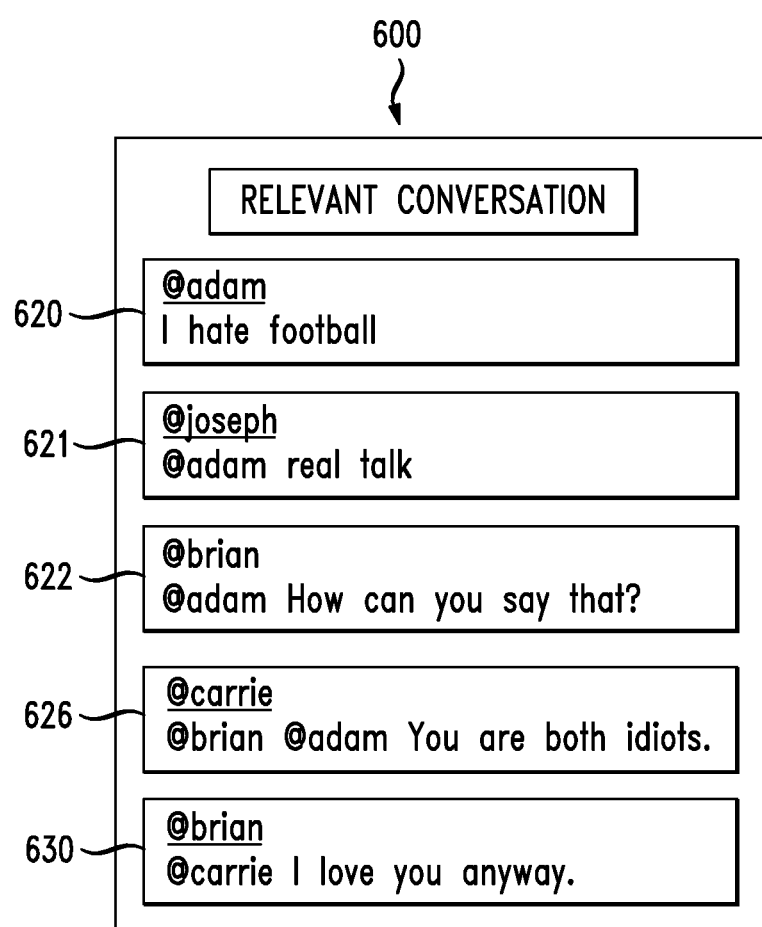

FIG. 6B depicts example user interface 600 which displays a relevant conversation including messages 620, 621, 622, 626, and 630 in response to selection of hyperlink 632 in message 622 of FIG. 6A. The messages displayed in FIG. 6A are based on accounts "Keith" (i.e., account "@keith") follows, while the messages displayed in FIG. 6B are messages included in the relevant conversation generated based on an embodiment of the method depicted in FIG. 5 (discussed above). As depicted in FIG. 6B, messages 620, 622, and 630 are augmented by the display of messages 621 and 626. Since messages determined to be part of the relevant conversation are depicted in FIG. 6B, the user associated with the account "@keith" can gain a better understanding of the exchange.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 5. Certain steps of the methods described herein, including one or more of the steps of FIG. 5, may be performed by a server or by another processor in a network-based cloud-computing system. Certain steps of the methods described herein, including one or more of the steps of FIG. 5, may be performed by a client computer in a network-based cloud computing system. The steps of the methods described herein, including one or more of the steps of FIG. 5, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 5, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
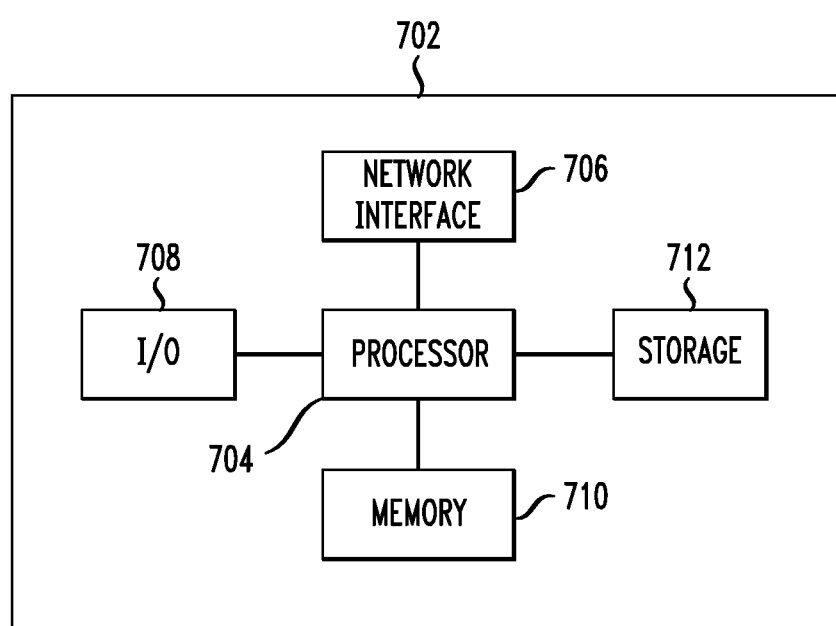
FIG. 7 depicts a high-level block diagram of a computer for identifying relevant messages in a conversation graph, in accordance with one or more embodiments of the invention.

A high-level block diagram of an example computer that may be used to implement systems, apparatus, and methods described herein is depicted in FIG. 7. Computer 702 includes a processor 704 operatively coupled to a data storage device 712 and a memory 710. Processor 704 controls the overall operation of computer 702 by executing computer program instructions that define such operations. The computer program instructions may be stored in data storage device 712, or other computer readable medium, and loaded into memory 710 when execution of the computer program instructions is desired. Thus, the method steps of FIG. 5 can be defined by the computer program instructions stored in memory 710 and/or data storage device 712 and controlled by processor 704 executing the computer program instructions. For example, the computer program instructions can be implemented as computer executable code programmed by one skilled in the art to perform the method steps of FIG. 5. Accordingly, by executing the computer program instructions, the processor 704 executes the method steps of FIG. 5. Computer 702 also includes one or more network interfaces 706 for communicating with other devices via a network. Computer 702 also includes one or more input/output devices 708 that enable user interaction with computer 702 (e.g., display, keyboard, mouse, speakers, buttons, etc.).

Processor 704 may include both general and special purpose microprocessors, and may be the sole processor or one of multiple processors of computer 702. Processor 704 may include one or more central processing units (CPUs), for example. Processor 704, data storage device 712, and/or memory 710 may include, be supplemented by, or incorporated in, one or more application-specific integrated circuits (ASICs) and/or one or more field programmable gate arrays (FPGAs).

Data storage device 712 and memory 710 each include a tangible non-transitory computer readable storage medium. Data storage device 712, and memory 710, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 708 may include peripherals, such as a printer, scanner, display screen, etc. For example, input/output devices 708 may include a display device such as a cathode ray tube (CRT) or liquid crystal display (LCD) monitor for displaying information to the user, a keyboard, and a pointing device such as a mouse or a trackball by which the user can provide input to computer 702.

Any or all of the systems and apparatus discussed herein, including messaging platform 100, may be implemented using one or more computers such as computer 702.

One skilled in the art will recognize that an implementation of an actual computer or computer system may have other structures and may contain other components as well, and that FIG. 7 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

What is claimed is:

1. A method for identifying relevant messages in a conversation graph on a messaging platform, the method comprising:
   transmitting, over a network, messages between a plurality of users on the messaging platform;
   generating a conversation graph based on relationships between the messages, the conversation graph including a plurality of messages related to a conversation, the plurality of messages of the conversation graph including a root message and one or more reply messages connected to the root message;
   marking a subset of the plurality of messages of the conversation graph as relevant to the conversation, including marking a message from a user account having a credibility rating over a threshold level; and
   transmitting, over the network, digital information to render the subset of the plurality of messages on a user interface of a computing device.

2. The method of claim 1, further comprising:
   programmatically calculating the credibility rating based on at least one of relationships of the user account with other user accounts in a connection graph or interactions with messages shared on the message platform.

3. The method of claim 1, further comprising:
   programmatically calculating the credibility rating based on relationships of the user account with other user accounts in a connection graph, including increasing the credibility rating in response to the user account being linked, in the connection graph, with more than one user account that have posted messages on the messaging platform above a threshold amount.

4. The method of claim 1, wherein the credibility rating includes a quantitative indicator.

5. The method of claim 1, wherein the credibility rating includes a qualitative indicator.

6. The method of claim 1, wherein the credibility rating of the user account is stored in a connection graph at a server computer of the messaging platform.

7. The method of claim 1, further comprising:
   identifying a reply structure based on metadata associated with each message; and
   generating the conversation graph based on the reply structure.

8. The method of claim 1, wherein the message is eligible to be marked for inclusion within the subset if the credibility rating is above the threshold level and the user account of the message is linked, in a connection graph, to a number of other user accounts over a threshold amount.

9. The method of claim 1, further comprising:
   receiving a request for additional relevant messages related to the conversation graph; and
   transmitting, over the network, another subset of messages from the conversation graph in response to the request.

10. The method of claim 1, further comprising:
    identifying a context message in the conversation graph;
    filtering the conversation graph to include the root message, the context message, messages connecting the root message to the context message, and direct or indirect children messages of the context message; and
    identifying the subset of the plurality of messages using the filtered conversation graph.

11. The method of claim 10, wherein the subset of the plurality of messages includes the context message, one or more messages of the conversation graph that were posted to the messaging platform before the context message, and one or more messages of the conversation graph that were posted to the messaging platform after the context message.

12. A messaging system for identifying relevant messages of a conversation graph, the system comprising:
    one or more computer processors;
    a conversation module configured to execute on the one or more computer processors, the conversation module configured to generate a conversation graph based on relationships between messages exchanged on a messaging platform, the conversation graph including a plurality of messages, the plurality of messages including a root message and one or more reply messages connected to the root message,
    the conversation module configured to mark a subset of the plurality of messages of the conversation graph as relevant, including:
       obtain a credibility rating of a user account associated with a message included in the conversation graph from a connection graph stored at a server computer of the messaging platform;
       mark the message as relevant in response to the credibility rating being over a threshold level; and
    a frontend module configured to execute on the one or more computer processors, the frontend module configured to transmit, over a network, digital information to render the subset of the plurality of messages on a user interface of a computing device.

13. The messaging system of claim 1, wherein the messaging system is configured to programmatically calculate the credibility rating based on at least one of relationships of the user account with other user accounts in the connection graph or interactions with messages shared on the message platform.

14. The messaging system of claim 1, wherein the messaging system is configured to programmatically calculate the credibility rating based on relationships of the user account with other user accounts in the connection graph, including increasing the credibility rating in response to the user account being linked, in the connection graph, with more than one user account that have posted messages on the messaging platform above a threshold amount.

15. The messaging system of claim 1, wherein the conversation module is configured to:
    identify a reply structure based on metadata associated with each message; and
    generate the conversation graph based on the reply structure.

16. A non-transitory computer-readable medium storing executable instructions that when executed by at least one processor are configured to cause the at least one processor to:
    transmit, over a network, messages between a plurality of users on the messaging platform;
    generate a conversation graph based on relationships between the messages, the conversation graph including a plurality of messages related to a conversation, the plurality of messages of the conversation graph including a root message and one or more reply messages connected to the root message;
    programmatically calculate a credibility rating associated with a user account;
    store the credibility rating in association with the user account in a connection graph stored at a server computer of the messaging platform, the connection graph linking the user account to other user accounts of the messaging platform;

mark a subset of the plurality of messages of the conversation graph as relevant to the conversation, including mark a message from the conversation graph in response to the credibility rating of the user account that posted the message being over a threshold level; and transmit, over the network, digital information to render the subset of the plurality of messages on a user interface of a computing device.

17. The non-transitory computer-readable medium of claim 16, further comprising:

programmatically calculate the credibility rating based on relationships of the user account with other user accounts in the connection graph, wherein the credibility rating is increased in response to the user account being linked, in the connection graph, with more than one user account that have posted messages on the messaging platform above a threshold amount.

18. The non-transitory computer-readable medium of claim 16, further comprising:

identify a context message in the conversation graph;

filter the conversation graph to include the root message, the context message, messages connecting the root message to the context message, and direct or indirect children messages of the context message; and identify the subset of the plurality of messages using the filtered conversation graph.

19. The non-transitory computer-readable medium of claim 18, wherein the subset of the plurality of messages includes the context message, one or more messages of the conversation graph that were posted to the messaging platform before the context message, and one or more messages of the conversation graph that were posted to the messaging platform after the context message.

20. The non-transitory computer-readable medium of claim 16, wherein the message is eligible to be marked for inclusion within the subset if the credibility rating is above the threshold level and the user account of the message is linked, in a connection graph, to a number of other user accounts over a threshold amount.

* * * * *